United States Patent
Mortzheim et al.

(10) Patent No.: US 8,205,333 B2
(45) Date of Patent: Jun. 26, 2012

(54) METHOD AND SYSTEM FOR FABRICATING A SEAL RING

(75) Inventors: Jason Paul Mortzheim, Gloversville, NY (US); William Edward Adis, Scotia, NY (US); Edward Arthur Dewhurst, Niskayuna, NY (US); Reni Boisvert, Glens Falls, NY (US)

(73) Assignee: General Electric Company, Schenectady, NY (US)

( * ) Notice: Subject to any disclaimer, the term of this patent is extended or adjusted under 35 U.S.C. 154(b) by 1101 days.

(21) Appl. No.: 12/043,258

(22) Filed: Mar. 6, 2008

(65) Prior Publication Data
US 2009/0223050 A1     Sep. 10, 2009

(51) Int. Cl.
*B21D 53/84* (2006.01)
(52) U.S. Cl. ........... 29/888.3; 29/557; 29/559; 277/314; 277/924; 82/112; 82/123; 82/159
(58) Field of Classification Search .......... 29/557, 29/559, 888.03, 888.3; 277/314, 924; 82/123, 82/159, 112
See application file for complete search history.

(56) References Cited

U.S. PATENT DOCUMENTS

| | | | |
|---|---|---|---|
| 3,839,942 A * | 10/1974 | Ferchland | 409/132 |
| 4,268,046 A | 5/1981 | Nisper | |
| 4,461,067 A * | 7/1984 | Weissing et al. | 29/564.1 |
| 5,048,382 A * | 9/1991 | Mitchell | 82/1.11 |
| 6,131,910 A | 10/2000 | Bagepalli et al. | |
| 6,257,586 B1 | 7/2001 | Skinner et al. | |
| 6,435,513 B2 | 8/2002 | Skinner et al. | |
| 6,969,231 B2 | 11/2005 | Ghasripoor et al. | |

FOREIGN PATENT DOCUMENTS
GB      1368773 A   * 10/1974
* cited by examiner

*Primary Examiner* — Derris Banks
*Assistant Examiner* — Azm Parvez
(74) *Attorney, Agent, or Firm* — Armstrong Teasdale LLP

(57) ABSTRACT

A method is provided for fabricating a seal ring. The method includes positioning a mount assembly adjacent to at least one of an inner diameter and an outer diameter of an annular seal ring, and securing the annular seal ring to the mounting assembly. The method also includes forming at least one of an admission side hook and a steam joint side hook in the annular seal ring.

9 Claims, 5 Drawing Sheets

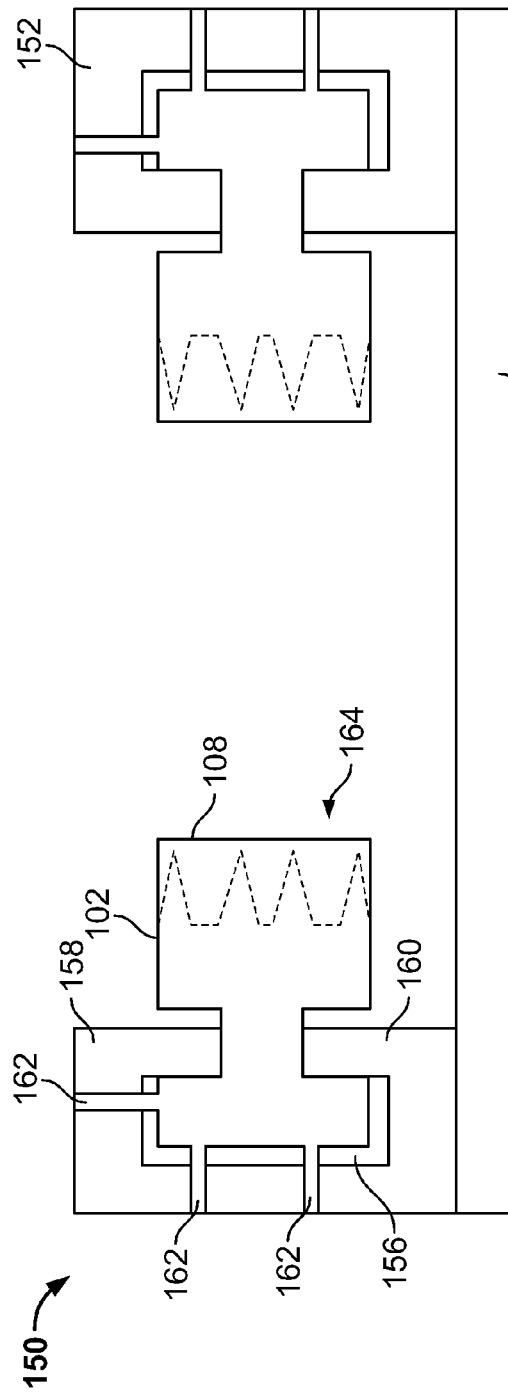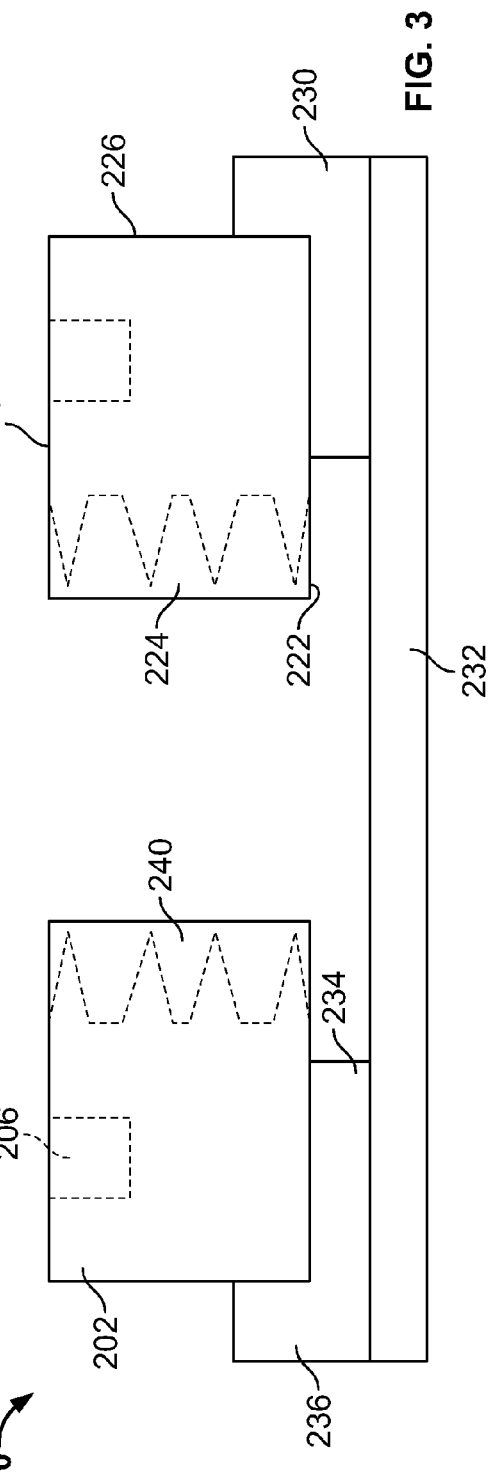

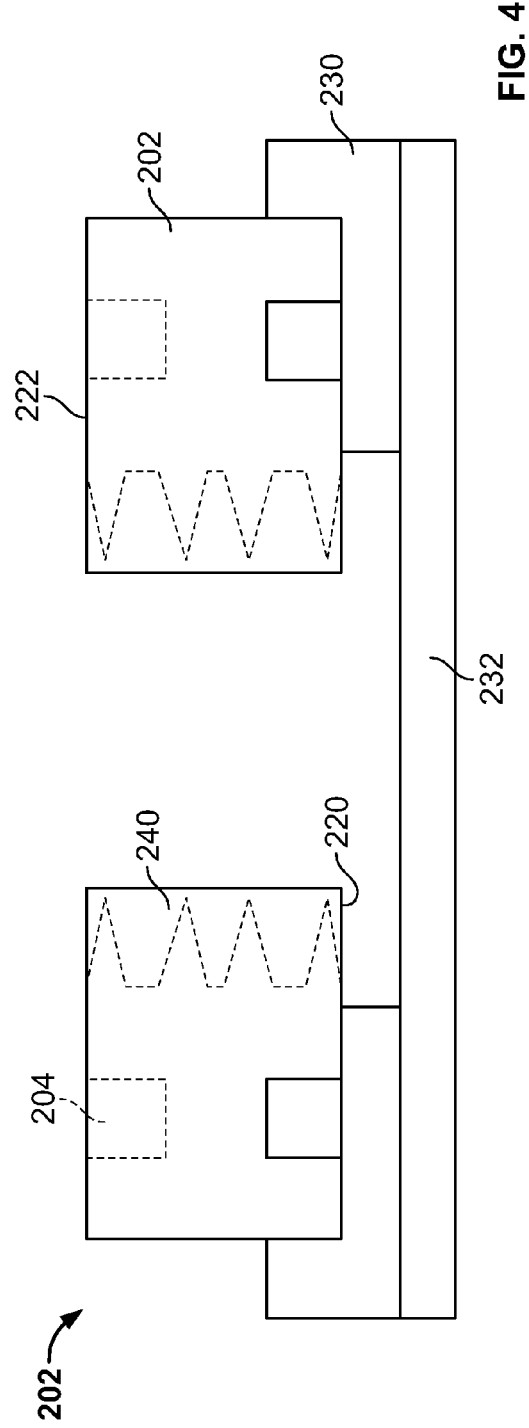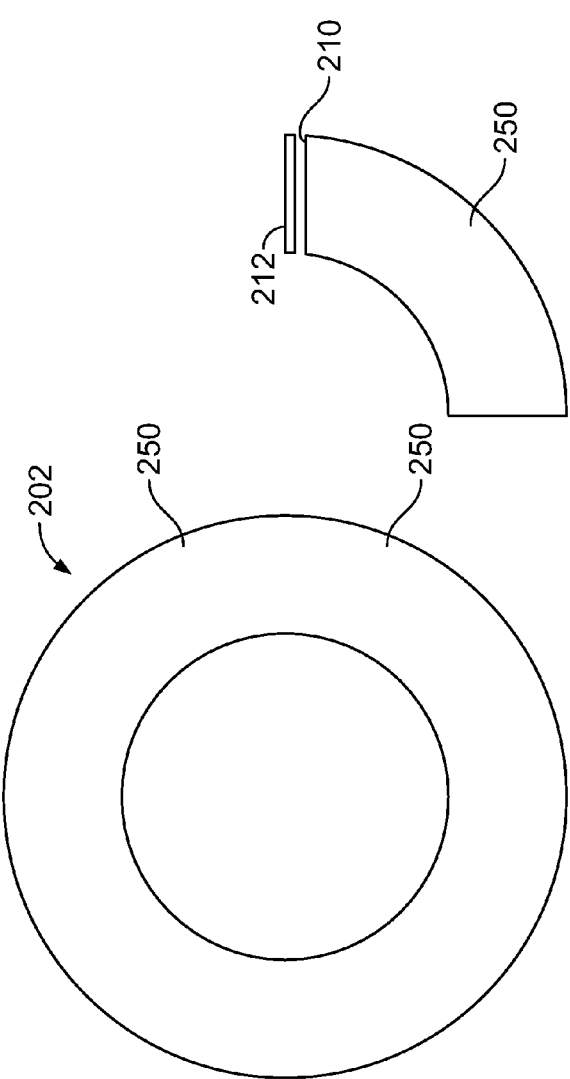

METHOD AND SYSTEM FOR FABRICATING A SEAL RING

BACKGROUND OF THE INVENTION

The field of the present invention relates generally to turbine engines, and more specifically, to methods and systems for manufacturing a seal ring for use with a turbine engine.

Known assembly methods for packing rings often result in producing packing rings that have a side-to-side clearance variation that may prohibit proper tooth contact between the packing ring and the rotor. More specifically, the side-to-side tooth clearance variation may create an offset between the steam joint (SJ) and the admission (ADM) side hook diameters. As a result, the packing ring may tilt when installed in the turbine to cause the side-to-side clearance variation.

Generally, the SJ to ADM hook variation results from seal ring manufacturing processes in which a raw stock material is mounted in a lathe while one side of the ring is cut. The partially cut seal ring is then uncoupled from the lathe and a set of locating features are cut into a mounting plate. The partially cut seal ring is then flipped over and mounted onto the mounting plate to enable the second side of the seal ring to be cut. Because of small features that are common on most seal ring designs, and because of offsets in hook diameters it may be difficult to securely mount the ring to the lathe after it has been flipped over. Rocking may occur if the ring was not securely mounted after being flipped. Further, current seal ring manufacturing processes may also create seal rings that have butt gaps that are out of tolerance to a point that the rings are not usable.

BRIEF DESCRIPTION OF THE INVENTION

In one aspect, a method is provided for fabricating a seal ring. The method includes positioning a mount assembly adjacent to at least one of an inner diameter and an outer diameter of an annular seal ring, and securing the annular seal ring to the mounting assembly. The method also includes forming at least one of an admission side hook and a steam joint side hook in the annular seal ring.

In another aspect, a system is provided for use in fabricating a seal ring. The system includes a first mounting assembly that is configured to be positioned adjacent to at least one of an inner diameter and an outer diameter of an annular seal ring. The mounting assembly is configured to secure the annular seal ring. The system also includes a cutting tool that is configured to cut at least one of an admission side hook and a steam joint side hook into the seal ring.

In yet another aspect, a mounting assembly is provided for use in retaining an annular seal ring during fabrication. The mounting assembly is configured to be positioned adjacent to at least one of an inner diameter and an outer diameter of the seal ring. The mounting assembly is configured to secure the annular seal ring to enable a cutting tool to cut at least one of an admission side hook and a steam joint side hook into the seal ring.

BRIEF DESCRIPTION OF THE DRAWINGS

FIG. 2 is a schematic illustration of an exemplary mounting assembly that may be used to cut an inner diameter of the seal ring shown in FIG. 1.

FIG. 3 is a schematic illustration of an alternative mounting assembly that may be used to cut a steam joint side hook and/or an admission side hook into a seal ring.

FIG. 4 is a schematic illustration of the seal ring shown in FIG. 3 repositioned within the mounting assembly shown in FIG. 3 to enable the other of the steam joint side hook and the admission side hook to be cut.

FIG. 5 is a schematic illustration of the butt gaps of the seal ring shown in FIGS. 3 and 4 being set by a shim.

DETAILED DESCRIPTION OF THE INVENTION

The embodiments described herein provide systems and methods that improve current seal ring manufacturing processes to facilitate reducing quality issues associated with those processes. Specifically, as described above, commercially available seal rings often include hook-to-hook variations that result from positioning errors caused by cutting each hook during different machining operations. The exemplary systems and methods described herein compensate for the positioning errors that may occur in known processes by enabling the hook features to be cut in a single operation and/or positioning the ring in a more controllable orientation.

It should be noted that although the present invention is described with respect to manufacturing a seal ring, one of ordinary skill in the art should understand that the present invention is not limited to only being used to manufacture seal rings. Rather, the present invention may be used to manufacture any seal.

Figure 1:
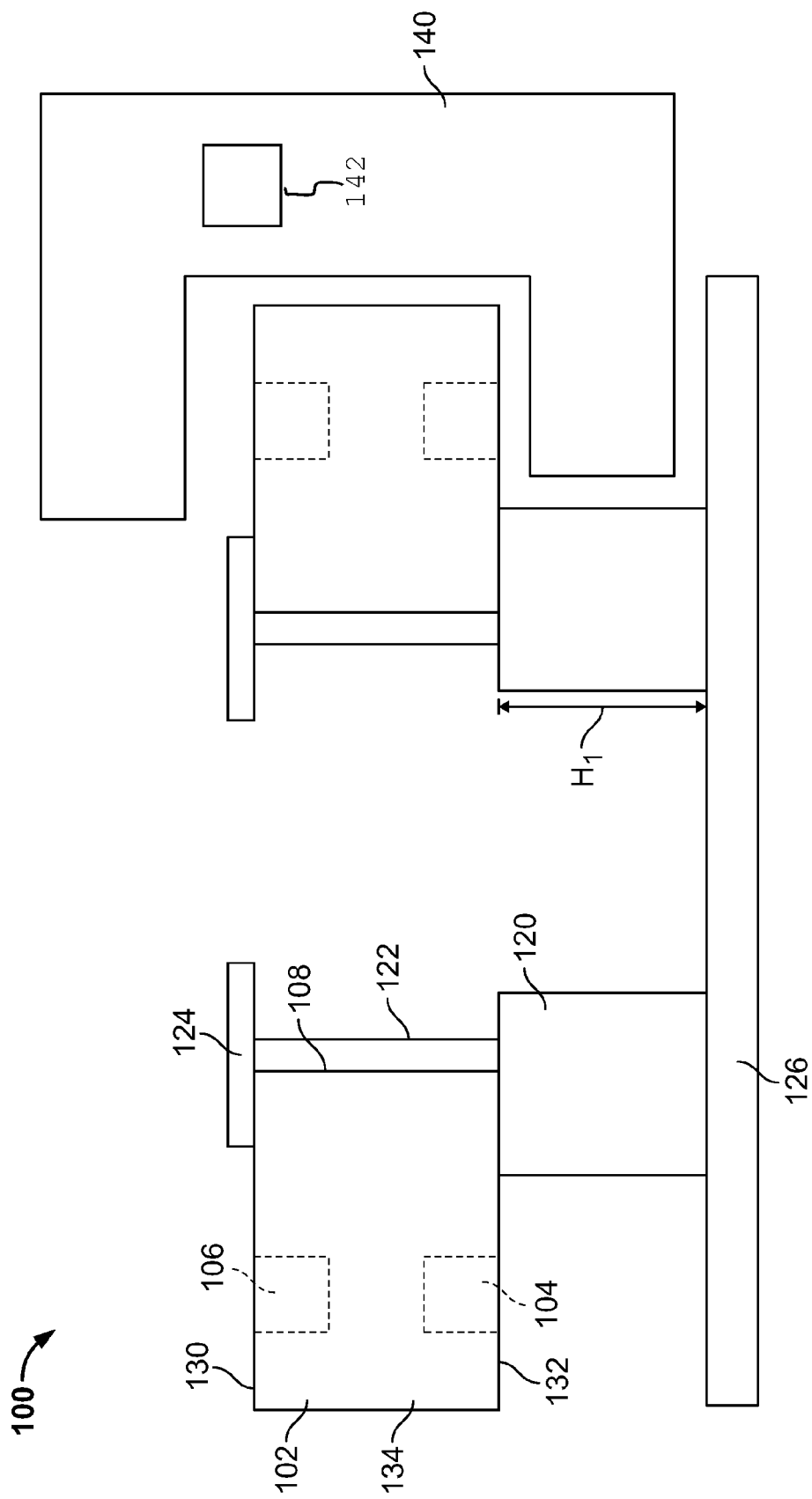
FIG. 1 is a schematic illustration of an exemplary mounting assembly that may be used to cut a steam joint side hook and/or an admission side hook into a seal ring.

FIG. 1 is a schematic illustration of an exemplary mounting assembly 100 that may be used to cut a steam joint side hook 104 and/or an admission side hook 106 into a seal ring 102. In the exemplary embodiment, seal ring 102 is formed from segmented sections of raw material. Mounting assembly 100 includes at least one riser block 120, at least one mount 122, and at least one clamp 124. In the exemplary embodiment, riser block 120 rests on a machine table 126 and has a height $H_1$ measured upward from table 126. Seal ring 102 is supported by riser block 120 such that an inner surface 108 of seal ring 102 is adjacent to mount 122, such that seal ring 102 is secured in position by mount 122. Clamp 124 is positioned adjacent to a first side or admission side 130 of seal ring 102 such that an opposite second side or steam side 132 of seal ring 102 is held substantially flush against riser block 120. In the exemplary embodiment, a tool access area 140 enables tool access to first side 130, second side 132, and to an outer surface 134 of seal ring 102. Accordingly, both steam joint side hook 104 and admission side hook 106 may be formed in seal ring 102 without having to reposition seal ring 102 within mounting assembly 100. In one embodiment, steam joint side hook 104 and admission side hook 106 are cut into seal ring 102 at substantially the same time. Although the exemplary embodiment illustrates admission side hook 106 being cut into seal first side 130 and steam joint side hook 104 being cut into seal ring second side 132, one of ordinary skill in the art should appreciate that admission side hook 106 may be formed in seal ring second side 132 and steam joint side hook 104 may be formed in seal ring first side 130.

FIG. 2 is a schematic illustration of an exemplary mounting assembly 150 that may be used to cut seal ring inner surface 108. In the exemplary embodiment, mounting assembly 150 includes at least one C-shaped block 152 that is supported on a machine table 154. In one embodiment, machine table 154 may be the same as machine table 126 (shown in FIG. 1). Seal 102 is positioned within block 152 such that outer surface 134 is positioned within an opening 156 defined within C-shaped block 152. Further, in the exemplary embodiment, a first arm 158 of C-shaped block 152 is positioned within admission side hook 106, and a second arm 160 of C-shaped block 152 is positioned within steam joint side hook 104. In an alternative embodiment, first arm 158 is positioned within steam joint side hook 104, and second arm 160 is positioned within admission side hook 106. A plurality of retention devices 162 extend through block 152 and are each positioned substantially flush against seal ring 102 to facilitate securely coupling seal ring 102 within block 152 such that a tool access area 164 is defined. Access area 164 provides tool access to seal ring inner surface 108. As such, a tooth profile 170 can be cut in seal ring inner surface 108.

Referring to FIGS. 1 and 2, a first embodiment of a seal ring fabrication process may be implemented wherein a seal ring 102 formed from segmented raw material is mounted in a first mounting assembly 100 on riser blocks 120. The height $H_1$ of riser blocks 102 ensures tool space is defined at both seal ring first side 130 and seal ring second side 132. In one embodiment, seal ring first side 130 and seal ring second side 132 are each formed in separate operations. Alternatively, seal ring first side 130 and seal ring second side 132 are formed in a single operation.

Seal ring 102 is dismounted and mounted to second mounting assembly 150 within C-shaped blocks 152. Blocks 152 are shaped to substantially match a shape of seal ring 102. In the exemplary embodiment, only a limited number of C-shaped blocks 152 are required for cutting a plurality of different rings 102. Further, the C-shaped blocks 152 are reusable when cutting other rings 102. Accordingly, in comparison to known seal ring fabrication processes, the processes described herein do not require a new set of C-shaped blocks 152 to be cut for each seal ring 102. Seal ring 102 is then secured within C-shaped blocks 152 via retention devices 162. Alternatively, seal ring 102 may be secured with blocks 152 using any other known securing device that facilitates a positive engagement on steam joint side hook 104 and/or admission side hook 106 as described herein. Accordingly, tooth profile 170 may be cut within inner surface 108 of seal ring 102 without creating clearance variations within seal ring 102.

FIG. 3 is a schematic illustration of an alternative mounting assembly 200 that may be used to form a steam joint side hook 204 and/or an admission side hook 206 into a seal ring 202. FIG. 4 is a schematic illustration of seal ring 202 repositioned within mounting assembly 200 to form the other of steam joint side hook 204 or admission side hook 206. FIG. 5 is a schematic illustration of butt gaps 210 of seal ring 202 being set by a shim 212. In the exemplary embodiment, seal ring 202 is formed from a single, centrifugal casting of raw material and includes a first side 220, an opposite second side 222, an inner surface 224, and an outer surface 226. Moreover, in the exemplary embodiment, mounting assembly 200 includes at least one riser block 230 that is supported on a machine table 232.

In the exemplary embodiment, riser block 230 is substantially L-shaped and includes a riser portion 234 having a first height $H_2$ and a retaining portion 236 having a second height $H_3$ that is taller than first height $H_2$. Seal ring second side 222 is oriented relative to riser portion 236 such that seal ring outer surface 226 is positioned substantially flush against retaining portion 236. Accordingly, riser block 230 is configured to retain seal 202 while steam joint side hook 204 and/or admission side hook 206 is formed in seal ring first side 220. Riser block 230 retains seal 202 such that seal ring first side 220 is positioned on riser portion 236 such that the remaining steam joint side hook 204 or admission side hook 206 is formed in seal ring second side 222. Moreover, seal ring 202 is positioned substantially flush against retaining portion 236 such that a tooth profile 240 can be formed in seal ring inner surface 224.

As illustrated in FIG. 5, after steam joint side hook 204, admission side hook 206, and tooth profile 240 are cut into ring 202, ring 202 is segmented to accommodate turbine assembly processes. In the exemplary embodiment, if required, a shim 212 is welded to each resulting segment 250 to facilitate restoring butt gap clearances within seal ring 202.

Using the embodiments illustrated in FIGS. 3-5 another embodiment of a seal ring manufacturing process may be implemented In such an embodiment, a single centrifugal casting of raw material is initially used to form seal ring 202, as opposed to known process that use a centrifugal casting cut into segments to form seal ring 202. More specifically, in the exemplary embodiment, a complete casting is mounted to mounting assembly 200, and either steam joint side hook 204 or admission side hook 206 is formed in seal ring first side 220. Ring 202 is then inverted and remounted to mounting assembly 200 as a complete casting that does not misalign, as compared to known individual segments that become misaligned when the second side of the ring is cut. The remaining steam joint side hook 204 or admission side hook 206 is then formed in seal ring second side 222. Although in the exemplary embodiment, seal ring first side 220 is formed first, as would be appreciated by one of ordinary skill in the art, seal ring second side 222 may be cut first and seal ring first side 220 may be cut after seal ring 202 is inverted. Similarly, tooth profile 240 may be cut into seal ring inner surface 224 when the seal ring 202 is first mounted to mounting assembly 200 or after seal ring 202 has been inverted.

In the exemplary embodiment, seal ring 202 is segmented after the joint side hook 204 or admission side hook 206 are formed. Specifically, seal ring 202 is segmented using a cutting tool 142 (shown in FIG. 1). Cutting tool 142 may include, without limitation, an electrical discharge machine (EDM), a water jet, and/or any other suitable precision cutting process that enables the casting to be segmented such that butt gaps may be defined. In the exemplary embodiment, when a desired butt gap is designed to be smaller than a predetermined minimum tolerance of the cutting operation, the butt gap is restored by coupling, via a welding process, for example, a thin plate and/or shim 212 to an end of one or more segments 250. Shim 212 has a cross-sectional shape that is generally the same shape as a cross sectional shape of seal ring 202. Moreover, in the exemplary embodiment, shim 212 is cut with an EDM, a water jet, a photoetch and/or any other suitable manufacturing operation that is appropriate for use in cutting a thin metal segment.

In the exemplary embodiment, additional methods that utilize a build-up material may be used to restore the butt gap. For example, in one embodiment, one or more of end segments 250 are electroplated with nickel plating and/or electroless nickel plating to increase a thickness of one end of segment 250. In another embodiment, a thickness of one or more of the end segments 250 is increased using a cathotic arc and/or an EB deposition on the end of segment 250. In yet another embodiment, a coating such as, but not limited to, plasma and/or thermal spray is applied to one or more end segments 250 to create a layer having a desired thickness. In an alternative embodiment, a laser deposition of metal powder is applied to an end of segment 250.

Figure 6:
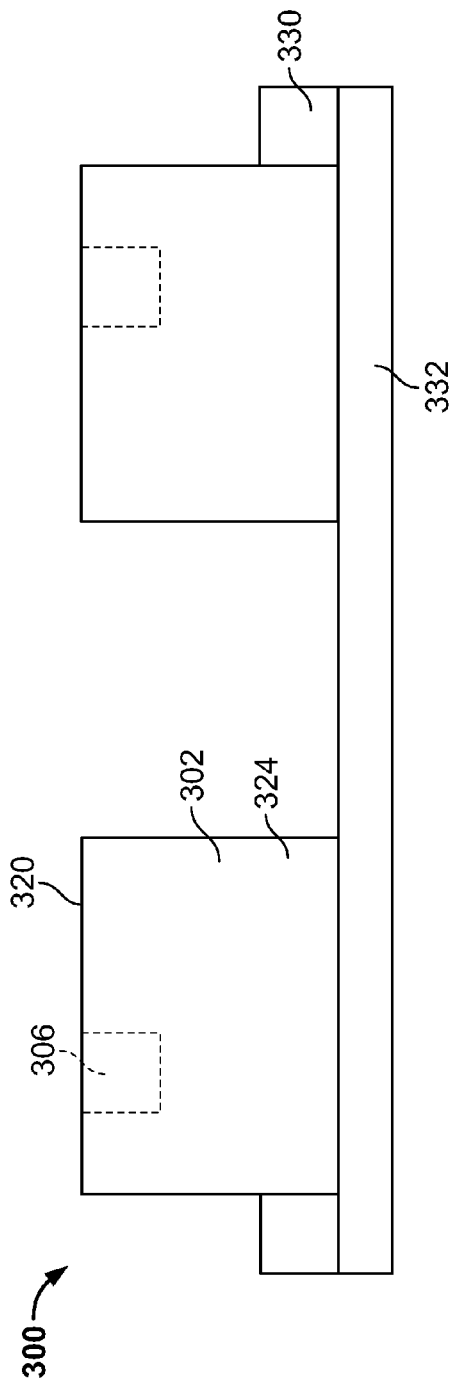
FIG. 6 is a schematic illustration of another alternative mounting assembly that may be used to cut a steam joint side hook and/or an admission side hook into a seal ring.
Figure 7:
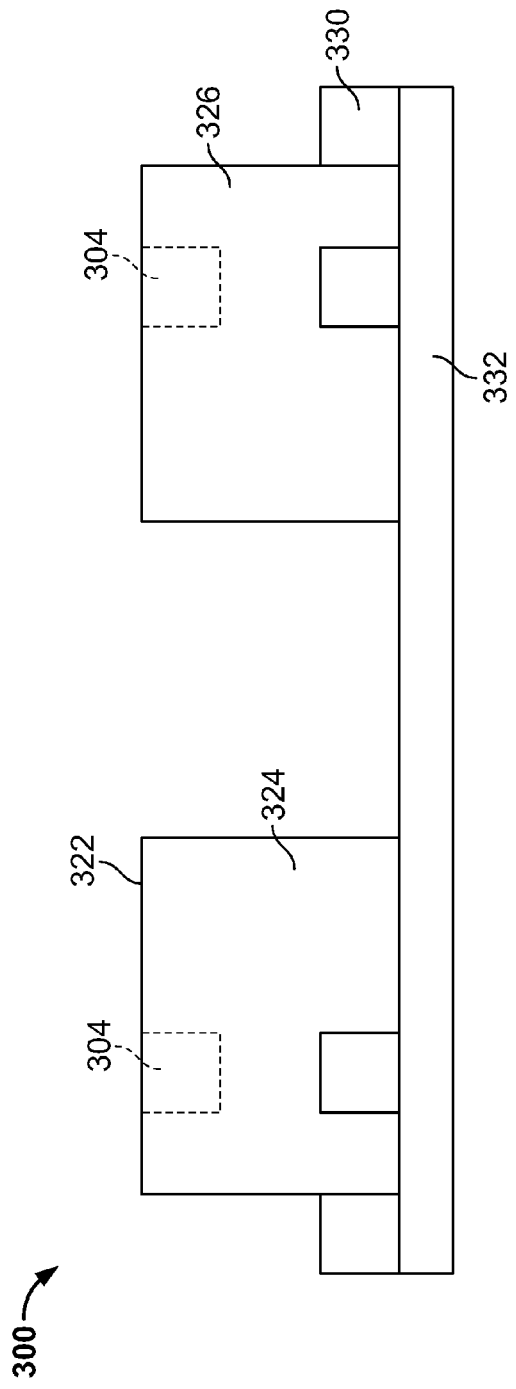
FIG. 7 is a schematic illustration of the seal ring shown in FIG. 6 repositioned within the mounting assembly shown in FIG. 6 to enable the other of the steam joint side hook and the admission side hook to be cut.
Figure 8:
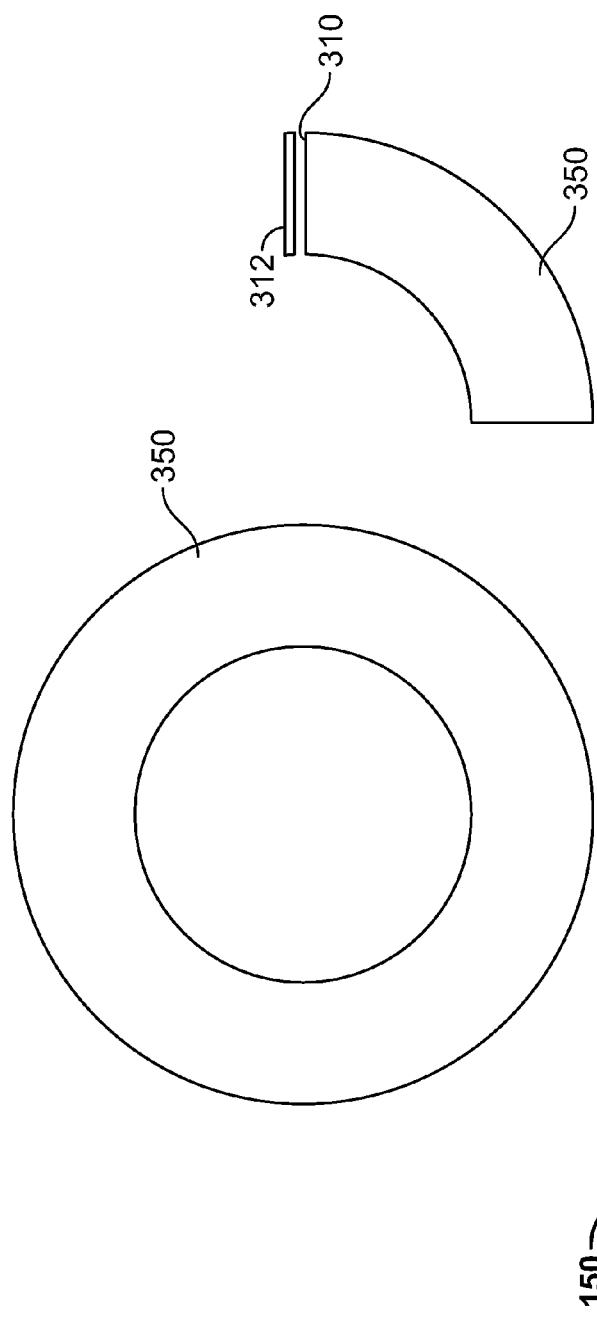
FIG. 8 is a schematic illustration of the butt gaps of the seal ring shown in FIG. 6 being set by a shim.
Figure 9:
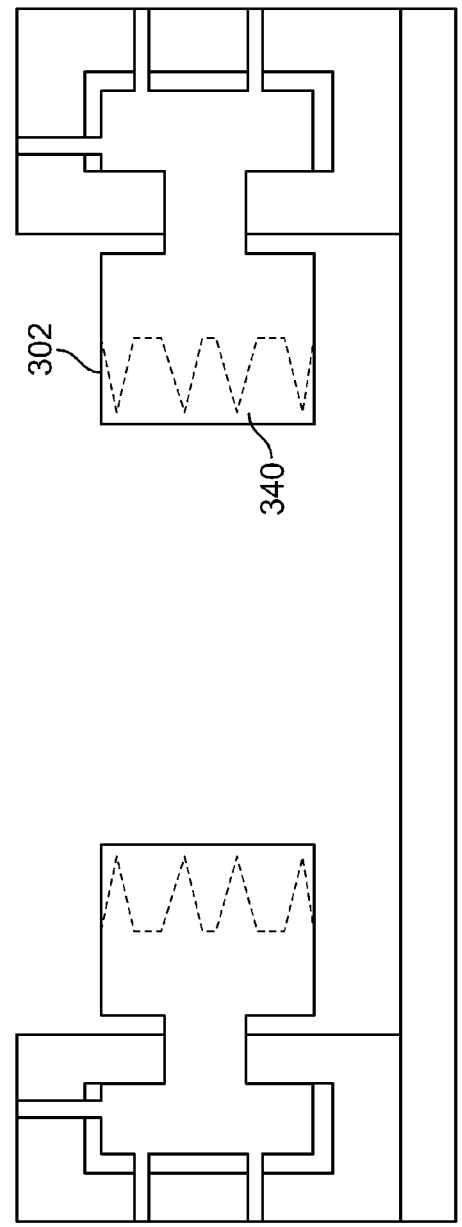
FIG. 9 is a schematic illustration of the seal ring shown in FIG. 6 and positioned within the mounting assembly shown in FIG. 2 to enable the inner diameter of the seal ring to be cut.

FIG. 6 is a schematic illustration of another alternative mounting assembly 300 that may be used to form a steam joint side hook 304 and/or an admission side hook 306 in a seal ring 302. FIG. 7 is a schematic illustration of seal ring 302 repositioned within mounting assembly 300 to enable the remaining steam joint side hook 304 and admission side hook 306 to be cut. FIG. 8 is a schematic illustration of seal ring butt gaps 310 being set by a shim 312. FIG. 9 is a schematic illustration of seal ring 302 positioned within mounting assembly 150 to cut an inner surface 324 of seal ring 302. In the exemplary embodiment, seal ring 302 is formed from a single centrifugal casting of raw material and includes a first side 320, an opposite second side 322, an inner surface 324, and an outer surface 326. Further in the exemplary embodiment, mounting assembly 300 includes at least one retaining block 330 that is supported on a machine table 332.

Seal ring second side 322 is supported on machine table 332 such that seal ring outer surface 326 is substantially flush against retaining block 330. Accordingly, retaining block 330 is retains seal 302 while steam joint side hook 304 and/or admission side hook 306 is formed in seal ring first side 320. Retaining block 330 is retains seal 302 such that seal ring first side 320 is secured on machine table 332 such that the remaining steam joint side hook 304 or admission side hook 306 may be formed in the seal ring second side 322.

As illustrated in FIG. 8, after steam joint side hook 304 and admission side hook 306 are formed in ring 302, ring 302 is segmented to accommodate turbine assembly processes. In the exemplary embodiment, if required, a shim 312 is welded to each resulting segment 350 to facilitate restoring butt gap clearances within seal ring 302. In the exemplary embodiment, seal ring 302 is welded to restore butt gap clearances in the same manner as described in the embodiment of the invention illustrated in FIG. 5.

As illustrated in FIG. 9, in the exemplary embodiment, the segmented seal ring 302 is secured within mounting assembly 150 (also shown in FIG. 2). When positioned in mounting assembly 150 a tooth profile 340 may be cut into seal ring inner surface 324 in the same manner as described in the embodiment of the invention illustrated in FIG. 2.

FIGS. 6-9 illustrate another embodiment of the invention that provides a seal ring manufacturing process that is a combination of other embodiments described herein. Specifically, the seal ring 302 is machined using a single centrifugal casting as described in the embodiment illustrated in FIGS. 3-5. In the exemplary embodiment, the complete casting is mounted and either steam joint side hook 304 and/or admission side hook 306 is formed in seal ring first side 320. Seal ring 302 is then inverted and remounted as a complete casting that does not misalign, as compared to known individual segments that misalign when the second side of the seal ring is cut. The remaining of steam joint side hook 304 and admission side hook 306 is then formed in seal ring second side 322. Although the exemplary embodiment, illustrates the seal ring first side 320 being formed first, as would be appreciated by one of ordinary skill in the art, the seal ring second side 322 may be formed first and seal ring first side 320 may be formed after seal ring 302 is inverted. Next, seal ring 302 is segmented per the processes described in the embodiment illustrated in FIGS. 3-5. The segments are then positioned in mounting assembly 150 and formed, as described in the embodiment illustrated in FIGS. 1 and 2.

This embodiment facilitates reducing variations in the steam joint and the admission side hooks during machining processes where the machine tools do not allow both sides of the seal ring hooks to be cut in a single machining operation. In particular, the exemplary embodiment facilitates overcoming the limits of requiring riser blocks to allow tool access to both sides of the seal ring.

In one embodiment, a method is provided for fabricating a seal ring. The method includes positioning a mount assembly adjacent to at least one of an inner diameter and an outer diameter of an annular seal ring, and securing the annular seal ring to the mounting assembly. The method also includes forming at least one of an admission side hook and a steam joint side hook in the annular seal ring. In the exemplary embodiment, the admission side hook and the steam joint side hook are formed at substantially the same time. Further, in one embodiment, the seal ring is secured on a riser.

In one embodiment, the method includes providing cutting tool access to at least one of a first side and a second side of the seal ring. In such an embodiment, the method includes cutting a tooth profile in the seal ring. For example, in one embodiment, the seal ring is positioned in a second mounting assembly and a tooth profile is cut in the seal ring while the seal ring is positioned in the second mounting assembly.

In one embodiment, one of the admission side hook and the steam joint side hook is cut into a first side of the seal ring while the seal ring is secured in a first position; and the other of the admission side hook and the steam joint side hook is cut into a second side of the seal ring while the seal ring is secured in a second position.

The above-described systems and methods facilitate preventing quality defects in seal rings, such as rocking and/or having inadequate butt gap clearances, during seal ring fabrication. Accordingly, the above-described systems and methods facilitate reducing assembly, manufacturing, and/or repair costs associated with turbine seal rings. Further, the above-described systems and methods facilitate improving seal ring and/or turbine performance.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for manufacturing a seal ring are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A system for use in fabricating a seal ring, said system comprising:
    a first mounting assembly configured to be positioned adjacent to at least one of an inner diameter and an outer diameter of an annular seal ring, wherein said mounting assembly is configured to secure the annular seal ring, said first mounting assembly comprising:

at least one riser configured to support the annular seal ring;

at least one mount extending outwardly from said at least one riser, said at least one mount adjacent to an inner surface of the annular seal ring; and a clamp coupled to said at least one mount, said clamp secures said annular seal ring to said riser; and a cutting tool configured to cut an admission side hook and a steam joint side hook into the seal ring at substantially the same time.

2. A system in accordance with claim 1, wherein said first mounting assembly is further configured to provide cutting tool access to at least one of a first side and a second side of the annular seal ring when the seal ring is secured to the mounting assembly.

3. A system in accordance with claim 1, wherein said cutting tool is further configured to cut a tooth profile in seal ring.

4. A system in accordance with claim 1, wherein said first mounting assembly is configured to:

secure the annular seal ring in a first position to enable said cutting tool to cut one of the admission side hook and the steam joint side hook into a first side of the seal ring; and secure the annular seal ring in a second position to enable said cutting tool to cut the other of the admission side hook and the steam joint side hook into a second side of the seal ring.

5. A system in accordance with claim 1, further comprising a second mounting assembly to secure the full seal ring to enable said cutting tool to cut a tooth profile into the inner diameter of the seal ring.

6. A mounting assembly for use in retaining an annular seal ring during fabrication, said mounting assembly is configured to be positioned adjacent to at least one of an inner diameter and an outer diameter of the seal ring, said mounting assembly is configured to secure the annular seal ring to enable a cutting tool to cut an admission side hook and a steam joint side hook into the seal ring at substantially the same time, wherein said mounting assembly further comprises:

at least one riser configured to support the annular seal ring;

at least one mount extending outwardly from said at least one riser, said at least one mount adjacent to an inner surface of said annular seal ring; and a clamp coupled to said at least one mount for securing said annular seal ring to said at least one riser.

7. A mounting assembly in accordance with claim 6, wherein said mounting assembly is further configured to provide cutting tool access to at least one of a first side and a second side of the seal ring when the seal ring is secured in said mounting assembly.

8. A mounting assembly in accordance with claim 6, wherein said mounting assembly is configured to secure the seal ring to enable the cutting tool to cut a tooth profile in the seal ring.

9. A mounting assembly in accordance with claim 6, wherein said mount is configured to:

secure the annular seal ring in a first position to enable the cutting tool to cut one of the admission side hook and the steam joint side hook into a first side of the seal ring; and secure the annular seal ring in a second position to enable the cutting tool to cut the other of the admission side hook and the steam joint side hook into a second side of the seal ring.

* * * * *